United States Patent
Yun et al.

(10) Patent No.: US 9,953,632 B2
(45) Date of Patent: Apr. 24, 2018

(54) KEYWORD MODEL GENERATION FOR DETECTING USER-DEFINED KEYWORD

(71) Applicant: QUALCOMM Incorporated, San Diego, CA (US)

(72) Inventors: Sungrack Yun, Seoul (KR); Taesu Kim, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/466,644

(22) Filed: Aug. 22, 2014

(65) Prior Publication Data
US 2015/0302847 A1  Oct. 22, 2015

Related U.S. Application Data

(60) Provisional application No. 61/980,911, filed on Apr. 17, 2014.

(51) Int. Cl.
*G10L 15/02* (2006.01)
*G10L 15/07* (2013.01)
(Continued)

(52) U.S. Cl.
CPC .............. *G10L 15/02* (2013.01); *G10L 15/07* (2013.01); *G10L 2015/027* (2013.01); *G10L 2015/088* (2013.01); *G10L 2015/226* (2013.01)

(58) Field of Classification Search
CPC ...................................................... G10L 15/02
See application file for complete search history.

(56) References Cited

U.S. PATENT DOCUMENTS 5,199,077 A * 3/1993 Wilcox ................. G10L 15/142
704/243
5,329,608 A * 7/1994 Bocchieri ............. G10L 15/187
704/243
(Continued)

FOREIGN PATENT DOCUMENTS

| EP | 0533491 B1 | 5/1998 |
| EP | 1215661 | * 12/2000 |
| WO | 0152239 A1 | 7/2001 |

OTHER PUBLICATIONS

Bou-Ghazale S. E. et al., "Hands-Free Voice Activation of Personal Communication Devices," 2000 IEEE International Conference on Acoustics, Speech, and Signal Processing, Piscataway, NJ, USA, vol. 3, Jun. 5-9, 2000, pp. 1735-1738.
International Search Report and Written Opinion of the International Searching Authority (EPO) for International Application No. PCT/US2015/024873, dated Jul. 2, 2015, 12 pages.
Wöllmer M. et al., "Multi-Stream LSTM-HMM Decoding and Histogram Equalization for Noise Robust Keyword Spotting," Cognitive Neurodynamics, Springer Netherlands, Dordrecht, vol. 5, No. 3, Aug. 9, 2011, pp. 253-264.

*Primary Examiner* — Ibrahim Siddo
(74) *Attorney, Agent, or Firm* — Toler Law Group, P.C.

(57) ABSTRACT

According to an aspect of the present disclosure, a method for generating a keyword model of a user-defined keyword in an electronic device is disclosed. The method includes receiving at least one input indicative of the user-defined keyword, determining a sequence of subwords from the at least one input, generating the keyword model associated with the user-defined keyword based on the sequence of subwords and a subword model of the subwords, wherein the subword model is configured to model a plurality of acoustic features of the subwords based on a speech database, and providing the keyword model associated with the user-defined keyword to a voice activation unit configured with a keyword model associated with a predetermined keyword.

30 Claims, 13 Drawing Sheets

(51) Int. Cl.
 *G10L 15/08* (2006.01)
 *G10L 15/22* (2006.01)

(56) References Cited

U.S. PATENT DOCUMENTS

| | | | |
|---|---|---|---|
| 5,623,578 A * | 4/1997 | Mikkilineni | G10L 15/063 704/232 |
| 5,768,474 A * | 6/1998 | Neti | G10L 15/02 704/202 |
| 5,960,395 A | 9/1999 | Tzirkel-Hancock | |
| 6,292,778 B1 * | 9/2001 | Sukkar | G10L 15/08 704/249 |
| 7,027,987 B1 * | 4/2006 | Franz | G10L 15/22 704/236 |
| 2003/0018743 A1 | 1/2003 | Tagi | |
| 2007/0136058 A1 | 6/2007 | Jeong et al. | |
| 2011/0288867 A1 * | 11/2011 | Chengalvarayan | G10L 15/063 704/251 |
| 2013/0289994 A1 | 10/2013 | Newman et al. | |
| 2014/0025379 A1 | 1/2014 | Ganapathiraju et al. | |
| 2014/0067391 A1 | 3/2014 | Ganapathiraju et al. | |
| 2015/0161989 A1 * | 6/2015 | Hsu | G10L 15/08 704/251 |

* cited by examiner

KEYWORD MODEL GENERATION FOR DETECTING USER-DEFINED KEYWORD

CROSS-REFERENCE TO RELATED APPLICATION(S)

This application is based upon and claims the benefit of priority from U.S. Provisional Patent Application No. 61/980,911, filed on Apr. 17, 2014, the entire contents of which are incorporated herein by reference.

TECHNICAL FIELD

The present disclosure relates generally to speech recognition in an electronic device, and more specifically, to generating a keyword model for use in detecting a user-defined keyword.

BACKGROUND

In recent years, electronic devices such as smartphones, tablet computers, wearable electronic devices, smart TVs, and the like are becoming increasingly popular among consumers. These devices typically provide voice and/or data communication functionalities over wireless or wired networks. In addition, such electronic devices generally include other features that provide a variety of functions designed to enhance user convenience.

Conventional electronic devices often include a speech recognition function for receiving voice commands from a user. Such a function allows an electronic device to perform a function associated with a voice command (e.g., a keyword) when the voice command from a user is received and recognized. For example, the electronic device may activate a voice assistant application, play an audio file, or take a picture in response to the voice command from the user.

In electronic devices having a speech recognition feature, manufacturers or carriers often equip the devices with predetermined keywords and associated sound models, which may be used in detecting the keywords in an input sound. Some electronic devices may also allow a user to designate a keyword as a voice command. For example, electronic devices may receive several utterances of a keyword from a user and generate a keyword model for the designated keyword from the utterances.

In general, the detection performance of a keyword model is related to the number of utterances from which the keyword model is generated. That is, the detection performance of a keyword model may improve as the number of utterances increases. For example, a manufacturer may provide a keyword model in an electronic device that has been generated from thousands of utterances or more.

In conventional electronic devices, however, the number of utterances of a keyword received from a user is relatively small (e.g., five). Thus, the keyword model generated from such limited number of utterances may not produce adequate detection performance. On the other hand, receiving a substantial number of utterances from a user to generate a keyword model that can provide sufficient detection performance may be time consuming and inconvenient to the user.

SUMMARY

The present disclosure relates to generating a keyword model for use in detecting a user-defined keyword.

According to one aspect of the present disclosure, a method for generating a keyword model of a user-defined keyword in an electronic device is disclosed. In this method, at least one input indicative of the user-defined keyword is received. From the at least one input, a sequence of subwords is determined. Based on the sequence of subwords and a subword model of the subwords, the keyword model associated with the user-defined keyword is generated. The subword model is configured to model or represent a plurality of acoustic features of the subwords based on a speech database. The keyword model associated with the user-defined keyword is provided to a voice activation unit configured with a keyword model associated with a predetermined keyword. This disclosure also describes apparatus, a device, a system, a combination of means, and a computer-readable medium relating to this method.

According to another aspect of the present disclosure, an electronic device for generating a keyword model of a user-defined keyword is disclosed. The electronic device includes an input unit, a voice activation unit, and a user-defined keyword model generation unit. The input unit is configured to receive at least one input indicative of the user-defined keyword. The voice activation unit is configured with a keyword model associated with a predetermined keyword. The user-defined keyword model generation unit is configured to determine a sequence of subwords from the at least one input, generate the keyword model associated with the user-defined keyword based on the sequence of subwords and a subword model of the subwords, and provide the keyword model associated with the user-defined keyword to the voice activation unit. The subword model is configured to model or represent a plurality of acoustic features of the subwords based on a speech database.

BRIEF DESCRIPTION OF THE DRAWINGS

Embodiments of the inventive aspects of this disclosure will be understood with reference to the following detailed description, when read in conjunction with the accompanying drawings.

DETAILED DESCRIPTION

Reference will now be made in detail to various embodiments, examples of which are illustrated in the accompanying drawings. In the following detailed description, numerous specific details are set forth in order to provide a thorough understanding of the present subject matter. However, it will be apparent to one of ordinary skill in the art that the present subject matter may be practiced without these specific details. In other instances, well-known methods, procedures, systems, and components have not been described in detail so as not to unnecessarily obscure aspects of the various embodiments.

Figure 1:
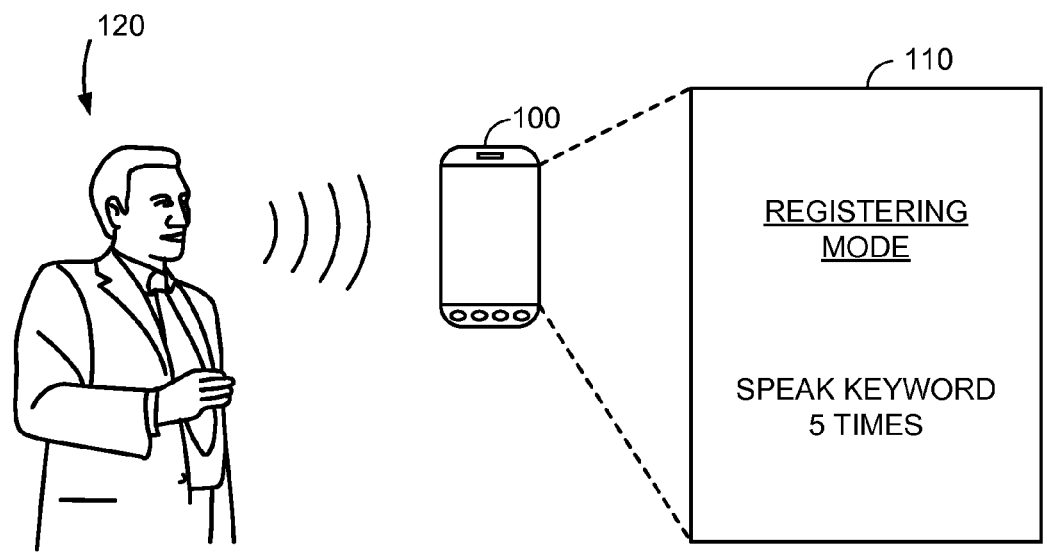
FIG. 1 illustrates an electronic device configured to generate a keyword model for use in detecting a user-defined keyword from at least one sample sound indicative of the user-defined keyword, according to one embodiment of the present disclosure.

FIG. 1 illustrates an electronic device 100 configured to generate a keyword model for use in detecting a user-defined keyword from at least one sample sound indicative of the user-defined keyword, according to one embodiment of the present disclosure. The electronic device 100 may be any suitable devices equipped with a sound capturing and processing capability such as a cellular phone, a smartphone, a personal computer, a laptop computer, a tablet personal computer, a smart television, a gaming device, a multimedia player, etc. As used herein, the term "keyword" may refer to any digital or analog representation of one or more words or sound that can be used to activate a function or an application in the electronic device 100.

The electronic device 100 may store a set of predetermined keywords and/or another set of user-defined keywords. As used herein, the term "predetermined keyword" may refer to a keyword that has been predetermined for activating a function or an application in the electronic device 100. A keyword model or trained keyword model for a predetermined keyword may refer to a keyword detection model for use in detecting a predetermined keyword from an input sound to the electronic device 100. In some embodiments, a plurality of keyword models for a plurality of predetermined keywords may be generated by a third-party provider or a manufacturer of the electronic device 100 and pre-stored in the electronic device 100 and/or downloaded from an external server or device (not shown). Further, the term "user-defined keyword" may refer to a keyword that may be defined or designated for activating a function or an application by a user of the electronic device 100. A keyword model for a user-defined keyword may refer to a keyword detection model for use in detecting a user-defined keyword from an input sound to the electronic device 100. In some embodiments, keyword models for user-defined keywords may be generated or updated by a user based on a predetermined set of subword models, which will be described in more detail below with reference to FIG. 4.

In one embodiment, the electronic device 100 may be configured with a function or an application for designating a user-defined keyword in response to one or more sample sounds inputted by a user 120 in addition to the plurality of predetermined keywords stored in the electronic device 100. For designating a user-defined keyword, the electronic device 100 may provide a user interface to receive one or more sample sounds indicative of a user-defined keyword from the user 120. For example, a message "REGISTERING MODE . . . SPEAK KEYWORD 5 TIMES" may be displayed on a display screen 110 of the electronic device 100 to receive sample sounds indicative of a user-defined keyword from the user 120. Although five utterances for a user-defined keyword are requested in the illustrated embodiment, the number of utterances for a user-defined keyword may vary depending on a number of factors such as a user's convenience, performance requirement, and the like. For example, the number of utterances for a user-defined keyword may be determined as three to five times.

Based on the received sample sounds indicative of a user-defined keyword, the electronic device 100 may generate a keyword model for detecting the user-defined keyword, as will be described in detail below with reference to FIG. 8. The generated keyword model may be stored in the electronic device 100 and provided to a voice activation unit (not shown) in the electronic device 100. The voice activation unit may be any suitable processing unit in the electronic device 100 that is configured to detect a specific keyword (e.g., a used-defined keyword or a predetermined keyword) or voice of a specific user in an input sound to the electronic device 100. In one embodiment, the voice activation unit may access the generated keyword model for keyword recognition. In recognizing a keyword uttered by a user, the voice activation unit may search for a best match among keyword models for user-defined keywords as well as predetermined keywords.

According to one embodiment, the electronic device 100 may provide a user interface to receive an input from the user 120 relating to a function or an application which a user-defined keyword is associated with. For example, after sample sounds indicative of a user-defined keyword are received from the user 120, the electronic device 100 may receive an input for selecting a function or an application from the user 120 and assign the user-defined keyword to the selected function or application.

Figure 2:
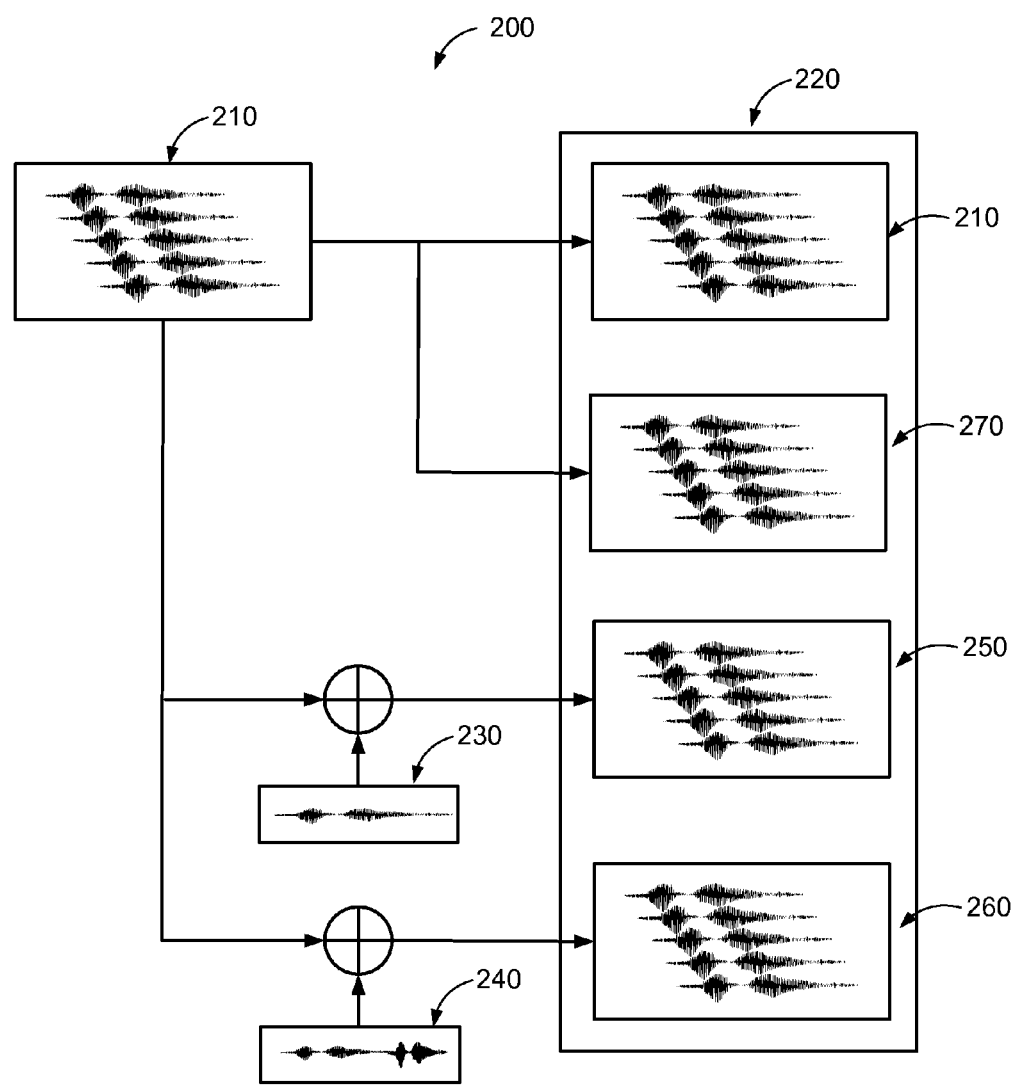
FIG. 2 illustrates a diagram of a method for generating one or more mixed sample sounds based on one or more sample sounds indicative of a user-defined keyword and one or more types of noise, according to one embodiment of the present disclosure.

FIG. 2 illustrates a diagram 200 of a method for generating one or more mixed sample sounds 220 based on one or more sample sounds 210 indicative of a user-defined keyword and one or more types of noise, according to one embodiment of the present disclosure. As described above with reference to FIG. 1, for designating a user-defined keyword, the electronic device 100 may receive the sample sounds 210 indicative of a user-defined keyword from the user 120. Upon receiving the sample sounds 210, the electronic device 100 may generate the mixed sample sounds 220 by adding at least one type of noise to the sample sounds 210 to increase the number of sample sounds that may be used for generating a keyword model for the user-defined keyword associated with the sample sounds 210. For example, car noise 230 may be added to each of the sample sounds 210 to generate one or more car-noise embedded sample sounds 250. Similarly, babble noise 240 may be added to each of the sample sounds 210 to generate one or more babble-noise embedded sample sounds 260. In one embodiment, any suitable types of noise such as car noise, babble noise, street noise, wind noise, and the like, or any combination thereof may be added to the sample sounds 210 to generate any suitable number of noise-embedded sample sounds. As will be described with reference to FIG. 8 below, the mixed sample sounds 220 including the sample sounds 210 and the noise-embedded sample sounds 250 and 260 may be used in detecting the user-defined keyword associated with the sample sounds 210 in various sound environments including a substantially noise-free environment and a noisy environment.

In some embodiments, the mixed sample sounds 220 may also include one or more duplicate sample sounds 270 of the sample sounds 210. Adding the duplicate sample sounds 270 to the mixed sample sounds 220 may increase the number of the sample sounds 210 to provide a larger number of the sample sounds 210. The larger number of the sample sounds 210 in the mixed sample sounds 220 may balance a ratio of the number of the sample sounds 210 and the number of the noise-embedded sample sounds 250 and 260 to provide a balanced detection performance. For example, if the number of noise-embedded sample sounds is larger than the number of the sample sounds 210, the user-defined keyword associated with the sample sounds 210 may not be accurately detected in a noise-free or substantially noise-free environment. In one embodiment, the mixed sample sounds 220 may include any suitable number of the duplicate sample sounds 270.

Figure 3:
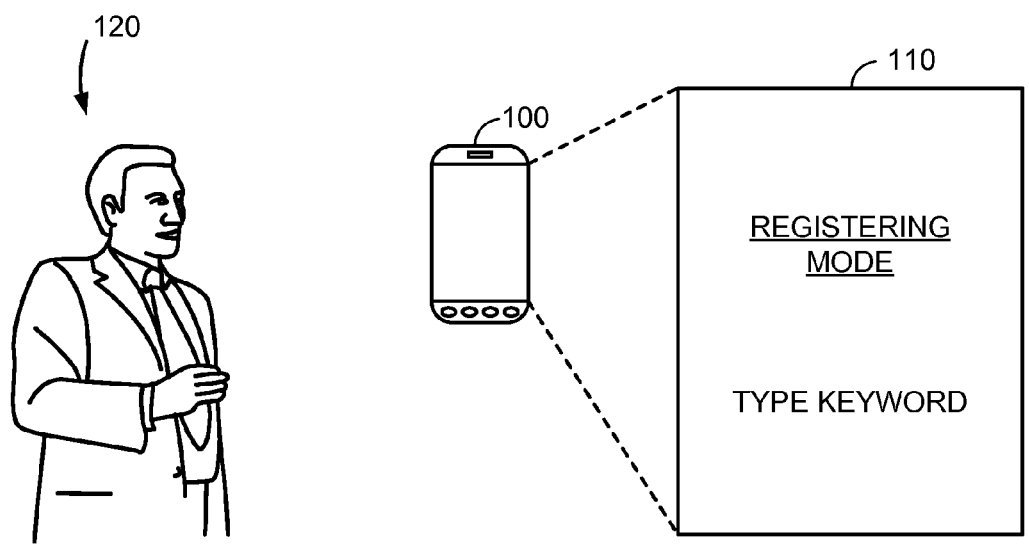
FIG. 3 illustrates an electronic device configured to generate a keyword model for use in detecting a user-defined keyword from text for the user-defined keyword, according to one embodiment of the present disclosure.

FIG. 3 illustrates the electronic device 100 configured to generate a keyword model for use in detecting a user-defined keyword from text for the user-defined keyword, according to one embodiment of the present disclosure. For designating a user-defined keyword, the electronic device 100 may provide a user interface to receive text for the user-defined keyword from the user 120. For example, a message "REGISTERING MODE . . . TYPE KEYWORD" may be displayed on the display screen 110 of the electronic device 100 to receive text (e.g., one or more words) for the user-defined keyword from the user 120.

Based on the received text for the user-defined keyword, the electronic device 100 may convert the text for the user-defined keyword into a sequence of subwords indicative of the user-defined keyword. As used herein, the term "subword" or "subword unit" may refer to a basic sound unit such as a phone, a phoneme, a triphone, a syllable, etc. A keyword such as a user-defined keyword or a predetermined keyword may be represented as a combination of one or more subwords or subword units. The electronic device 100 may then generate a keyword model from the sound data indicative of the user-defined keyword for use in detecting the user-defined keyword, as will be described in more detail with reference to FIG. 8. In one embodiment, the electronic device 100 may also provide a user interface to receive one or more sample sounds indicative of the user-defined keyword from the user 120 as described above with reference to FIG. 1. In this case, the electronic device 100 may generate a keyword model for detecting the user-defined keyword based on the sound data indicative of the user-defined keyword and the received sample sounds indicative of the user-defined keyword.

Figure 4:
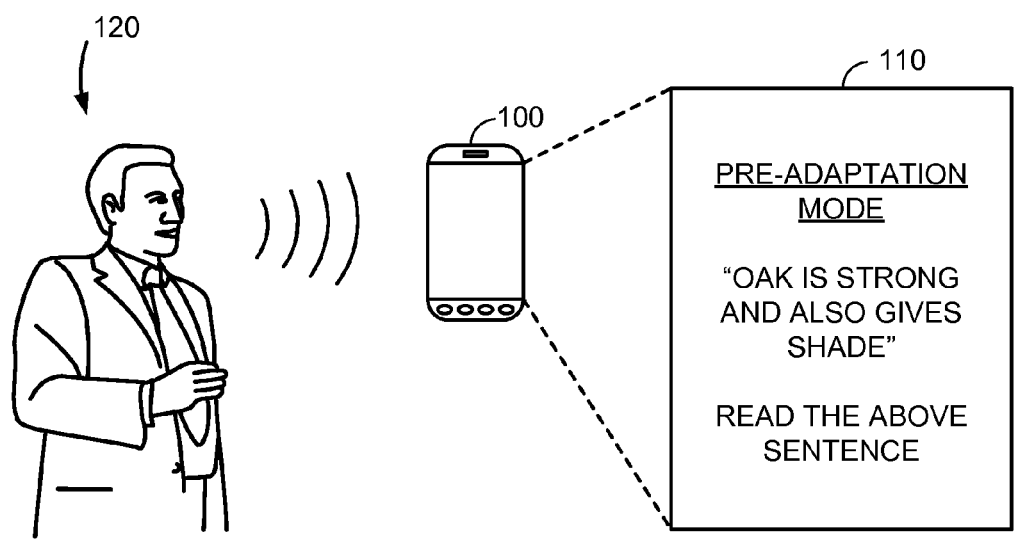
FIG. 4 illustrates an electronic device configured to adjust a subword model that may be used in generating a keyword model for detecting a user-defined keyword, according to one embodiment of the present disclosure.

FIG. 4 illustrates the electronic device 100 configured to adjust a subword model that may be used in generating a keyword model for detecting a user-defined keyword, according to one embodiment of the present disclosure. The electronic device 100 may initially store at least one subword model. The term "subword model" may refer to an acoustic model representing or indicative of acoustic features of a plurality of subwords or subword units, which can be generated and updated under a graphical model such as a hidden Markov model (HMM), a semi-Markov model (SMM), or a combination thereof.

The electronic device 100 may initially include one or more subword models that are pre-stored in the electronic device 100 and/or downloaded from an external server or device (not shown). The subword models may be generated based on a speech database, which may also be referred to as a speech corpus. The speech database may include a large number of sample sound data (e.g., thousands of speech samples or more) and/or text. The subword models may be generated from such a large number of sample sound data by extracting a plurality of acoustic features from the sample sound data and a keyword model for a user-defined keyword may be generated based on one or more subword models and sample sounds indicative of the user-defined keyword from a user. The keyword model thus generated may allow detection of a user-defined keyword with a high degree of accuracy even though the number of input sample sounds indicative of the user-defined keyword from the user may be relatively small (e.g., five).

In one embodiment, the subword models initially stored in the electronic device 100 may be user-independent and may not reflect specific voice features of a user. In this case, the electronic device 100 may be configured with a function or an application for pre-adaptation to adjust the subword models based on an input sound of a user. The function for pre-adaptation of subword models may be performed prior to generating a keyword model for detecting a user-defined keyword. Additionally or alternatively, the function for pre-adaptation may be performed after a keyword model for detecting a user-defined keyword has been generated.

For pre-adaptation, the electronic device 100 may provide a user interface to receive an input sound indicative of a predetermined sentence (e.g., a phrase) from the user 120. The predetermined sentence may be at least one of phonetically-balanced sentences (e.g., Harvard sentences) that may use specific phonemes at a same or similar frequency as the phonemes may appear in a language. For example, phonetically-balanced sentences may include sentences such as "Oak is strong and also gives shade," "Cats and dogs each hate the other," "The pipe began to rust while new," "Open the crate but don't break the glass," and the like. The electronic device 100 may store predetermined sentences and their sequences or networks of subwords.

In the illustrated embodiment, a message "PRE-ADAPTATION MODE . . . OAK IS STRONG AND ALSO GIVES SHADE . . . READ THE ABOVE SENTENCE" may be displayed on the display screen 110 of the electronic device 100 to receive an input sound indicative of the predetermined sentence "Oak is strong and also gives shade" from the user 120. Based on the received input sound, the electronic device 100 may adjust the subword models in such a manner as will be described in detail below with reference to FIG. 8. For example, the electronic device 100 may extract acoustic features from the received input sound and adjust acoustic parameters in the subword models based on the extracted acoustic features and the stored sequence or network of subwords for the predetermined sentence. In one embodiment, the electronic device 100 may recognize a sequence of subword units from the received input sound and use the recognized sequence of subwords to update the stored sequence or network of subwords for the predetermined sentence.

Figure 5:
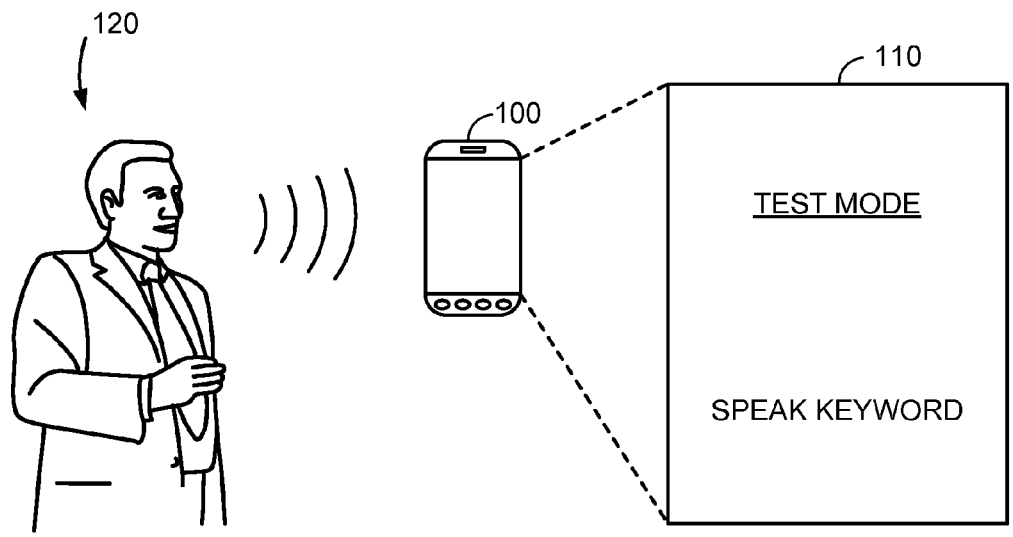
FIG. 5 illustrates an electronic device configured to adjust a threshold score for detecting a user-defined keyword based on an input sound, according to one embodiment of the present disclosure.

FIG. 5 illustrates the electronic device 100 configured to adjust a threshold score for detecting a user-defined keyword based on an input sound, according to one embodiment of the present disclosure. As used herein, the term "matching score" may refer to a value indicating the degree of similarity between an input sound and any keywords (e.g., a user-defined keyword or a predetermined keyword). Also, the term "threshold score" may refer to a threshold value for a matching score to ensure a desired accuracy in detecting a keyword in an input sound. For example, if the threshold score is too high, the electronic device 100 may not detect a keyword from an input sound that includes the keyword. On the other hand, if the threshold score is too low, the electronic device 100 may incorrectly detect a keyword in an input sound that does not include the keyword. As such, the threshold score for a user-defined keyword may be updated to ensure a desired detection accuracy after the keyword model for the user-defined keyword is generated.

In one embodiment, the electronic device 100 may be configured with a function or an application for adjusting a threshold score to further improve the accuracy in detecting a user-defined keyword in an input sound. The function for adjusting a threshold score may be activated after a keyword model for a user-defined keyword is generated and the threshold score for the keyword model is determined. For adjusting a threshold score, the electronic device 100 may provide a user interface to receive a test input sound indicative of a user-defined keyword from the user 120. For example, a message "TEST MODE . . . SPEAK KEYWORD" may be displayed on the display screen 110 of the electronic device 100 to receive a test input sound indicative of a user-defined keyword from the user 120.

From the received test input sound indicative of a user-defined keyword, the electronic device 100 may calculate a matching score of the test input sound based on the keyword model for the user-defined keyword. Based on the calculated matching score of the test input sound, the electronic device 100 may adjust the threshold score for the user-defined keyword. For example, when the calculated matching score is lower than the threshold score, the electronic device 100 may reduce the threshold score.

Figure 6:
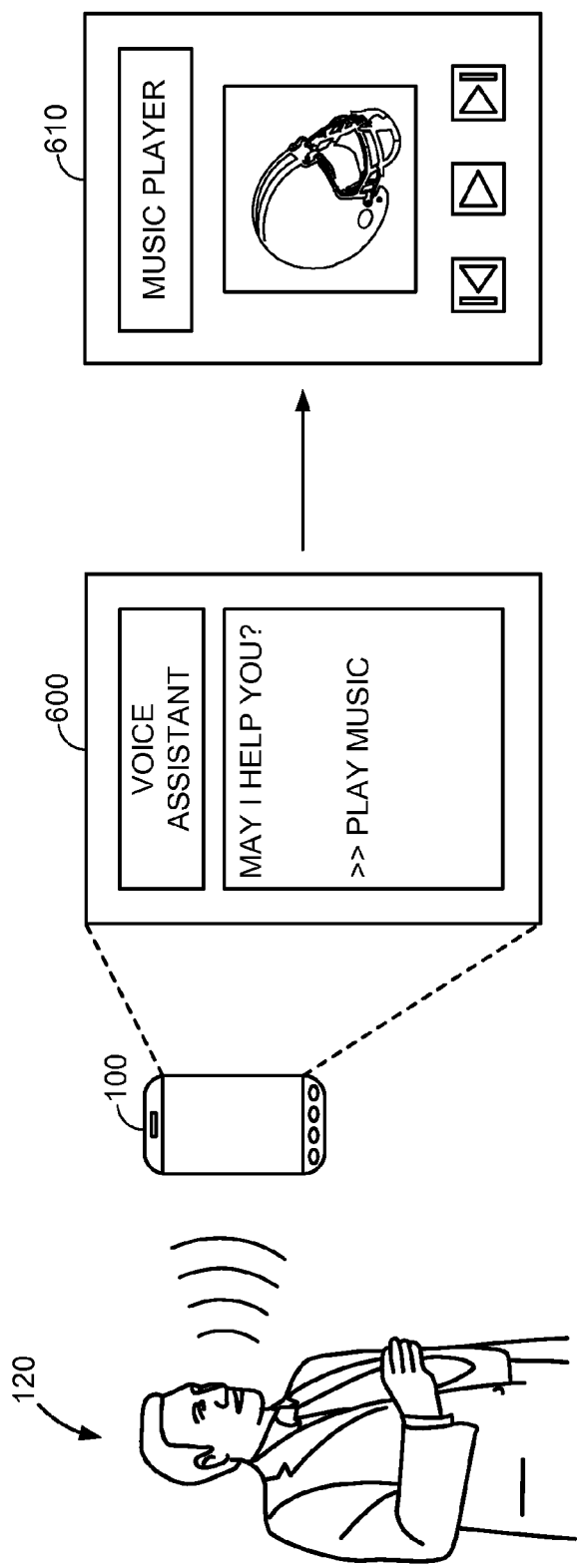
FIG. 6 illustrates activating a voice assistant application in an electronic device in response to detecting a keyword from an input sound, according to one embodiment of the present disclosure.

FIG. 6 illustrates activating a voice assistant application 600 in the electronic device 100 in response to detecting a keyword from an input sound, according to one embodiment of the present disclosure. Initially, the electronic device 100 may store keyword models for pre-determined keywords and/or user-defined keywords. To activate the voice assistant application 600, the user 120 may speak a keyword (e.g., a user-defined keyword or a pre-determined keyword), which is received by the electronic device 100. When the electronic device 100 detects the keyword, the voice assistant application 600 may be activated and output a message such as "MAY I HELP YOU?" on a display screen or through a speaker unit of the electronic device 100.

In response, the user 120 may activate various functions of the electronic device 100 through the voice assistant application 600 by speaking other voice commands. For example, the user 120 may activate a music player 610 by speaking a voice command "PLAY MUSIC." Although the illustrated embodiment illustrates activating the voice assistant application 600 in response to detecting the keyword, another application or function may be activated in response to detecting an associated keyword.

Figure 7:
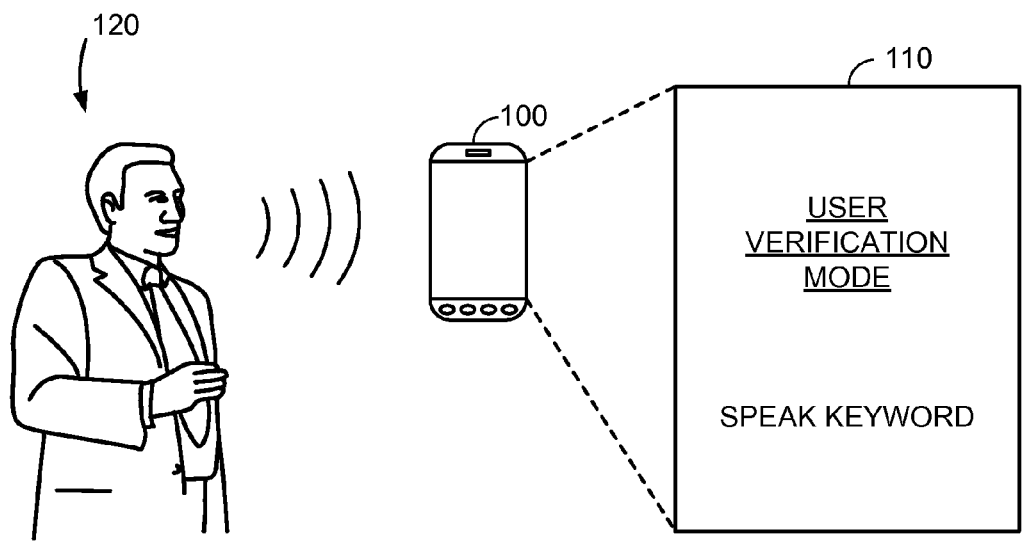
FIG. 7 illustrates an electronic device configured to recognize a user based on an input sound including a user-defined keyword, according to one embodiment of the present disclosure.

FIG. 7 illustrates the electronic device 100 configured to recognize a user based on an input sound including a user-defined keyword, according to one embodiment of the present disclosure. A keyword model for a user-defined keyword may incorporate user-specific acoustic features that may be used in recognizing the user. In one embodiment, the electronic device 100 may be configured with a function or an application for user verification using such user-specific acoustic features included in a keyword model for a user-defined keyword. Additionally, the electronic device 100 may include a user verification model that is used to verify a speech of a user, in addition to a keyword model for a user-defined keyword.

For user verification, the electronic device 100 may provide a user interface to receive an input sound indicative of a user-defined keyword from the user 120. For example, a message "USER VERIFICATION . . . SPEAK KEYWORD" may be displayed on the display screen 110 of the electronic device 100 to receive an input sound indicative of a user-defined keyword from the user 120. From the input sound, the electronic device 100 may detect the user-defined keyword based on a keyword model for the user-defined keyword and calculate a matching score of the input sound. When the matching score is higher than a keyword detection threshold, the electronic device 100 may determine the input sound as including the user-defined keyword. The electronic device 100 may then perform a user verification process on the input sound based on a user verification model and calculate a user verification score of the input sound. When the user verification score is higher than a user verification threshold, the electronic device 100 may determine the input sound as including a speech of a registered user. Alternatively, the electronic device 100 may perform a user verification process before performing a keyword detection process. In some embodiments, the electronic device 100 may perform a keyword detection process and a user verification process based on one model for detecting the user-defined keyword and verifying a speech of a registered user.

Figure 8:
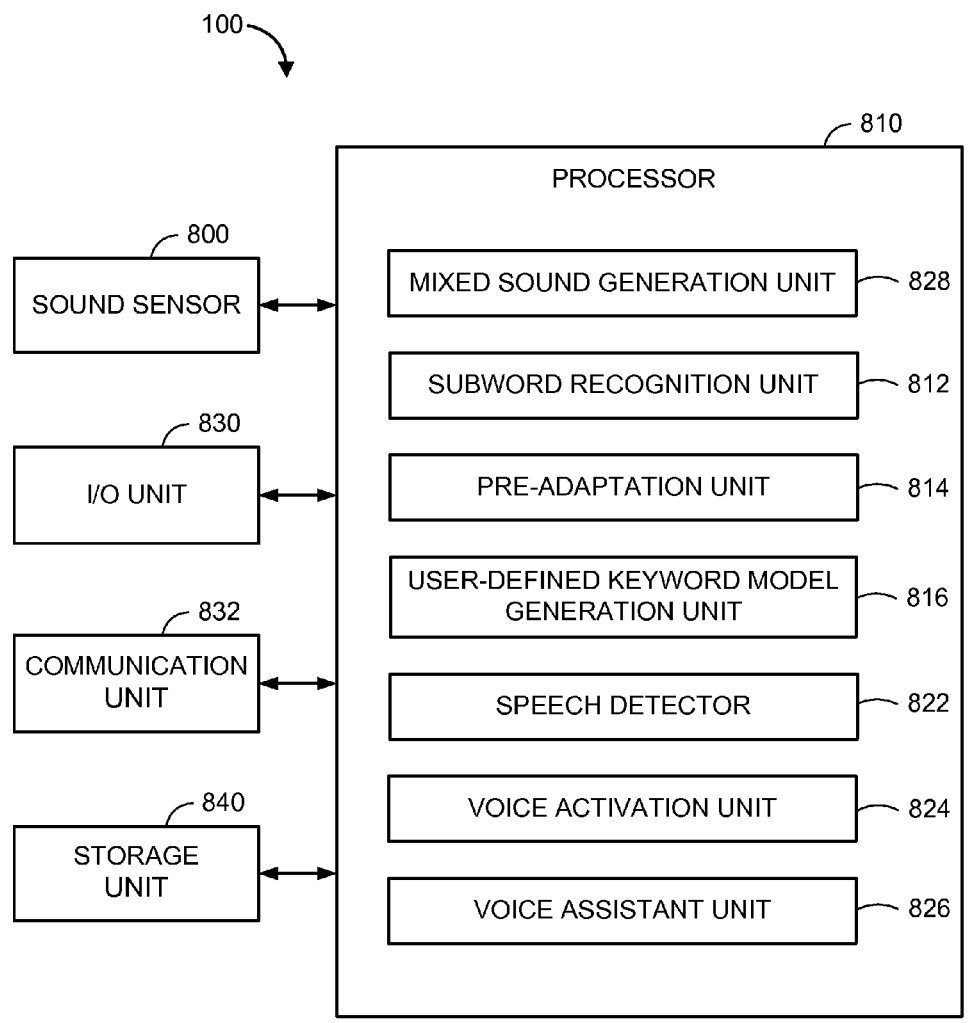
FIG. 8 illustrates a block diagram of an electronic device configured to generate a keyword model for a user-defined keyword and detect the user-defined keyword in an input sound stream based on the keyword model, according to one embodiment of the present disclosure.

FIG. 8 illustrates a block diagram of the electronic device 100 configured to generate a keyword model for a user-defined keyword and detect the user-defined keyword in an input sound stream based on the keyword model, according to one embodiment of the present disclosure. The electronic device 100 may include a sound sensor 800, a processor 810, an I/O (input/output) unit 830, a communication unit 832, and a storage unit 840. The processor 810 may include a mixed sound generation unit 828, a subword recognition unit 812, a pre-adaptation unit 814, a user-defined keyword model generation unit 816, a speech detector 822, a voice activation unit 824, and a voice assistant unit 826. The I/O unit 830 may include the display screen 110. The display screen 110 may be a touch display screen configured to receive a touch input from a user.

The sound sensor 800 may be configured to receive an input sound stream from a user. As used herein, the term "sound stream" may refer to a sequence of one or more sound signals or sound data. The sound sensor 800 may include one or more microphones or any other types of sound sensors that can be used to receive, capture, sense, and/or detect a sound input to the electronic device 100. In addition, the sound sensor 800 may employ any suitable software and/or hardware for performing such functions. The received input sound stream of a user may be stored in the storage unit 840. The sound sensor 800 may provide the received input sound stream of a user to the processor 810 for processing.

In one embodiment, the sound sensor 800 may receive an input sound stream including one or more sample sounds indicative of a user-defined keyword from a user. Upon receiving the input sound stream, the sound sensor 800 may detect each of the sample sounds from the input sound stream by detecting a start and end points of each of the sample sounds or isolated utterances in the input sound stream using any suitable endpoint detection algorithms. The detected sample sounds may be extracted and stored in the storage unit 840. The extracted sample sounds may be provided to the mixed sound generation unit 828 and/or the subword recognition unit 812. Alternatively, the sound sensor 800 may provide the input sound stream to the mixed sound generation unit 828, which may generate at least one mixed sound stream by adding at least one type of noise to the input sound stream. The subword recognition unit 812 may receive the mixed sound stream from the mixed sound generation unit 828 and detect and extract each of the sample sounds embedded with one or more types of noise from the mixed sound stream.

The mixed sound generation unit 828 in the processor 810 may be configured to generate one or more mixed sample sounds based on the extracted sample sounds from the sound sensor 800. For example, the mixed sample sounds may be generated by adding at least one type of noise to the extracted sample sounds. The generated mixed sample sounds may be stored in the storage unit 840. The generated mixed sample sounds and/or the extracted sample sounds from the sound sensor 800 may be provided to the subword recognition unit 812. In one embodiment, the mixed sample sounds may also include one or more duplicate sounds of the extracted sample sounds.

The storage unit 840 may be configured to store data and instructions for operating the sound sensor 800, the processor 810, the I/O unit 830, and the communication unit 832 and an input sound stream received by the sound sensor 800. The storage unit 840 may also store a pronunciation dictionary database including pronunciation data of dictionary words. The pronunciation dictionary database may be pre-stored in the storage unit 840 and/or downloaded from an external server or device (not shown) via the communication unit 832. The storage unit 840 may be implemented using any suitable storage or memory devices such as a RAM (Random Access Memory), a ROM (Read-Only Memory), an EEPROM (Electrically Erasable Programmable Read-Only Memory), a flash memory, or an SSD (solid state drive).

The storage unit 840 may also store at least one subword model. The subword model may include at least one subword model that is pre-stored in the storage unit 840 and/or downloaded from an external server or device (not shown) via the communication unit 832. Additionally, the subword model may include at least one adjusted subword model that has been adjusted from the initially stored subword model by the pre-adaptation unit 814.

In some embodiments, the subword model may be a phone-based model, a phoneme-based model, a triphone-based model, a syllable-based model, etc., according to the type of subwords represented by the subword model, and may include a list of subword units and model parameters for each subword unit. The model parameters may be obtained or estimated based on feature vectors extracted from speech data of subwords. The feature vectors may include at least one of mel frequency cepstral coefficients (MFCC), cepstrum difference coefficients (delta MFCC), linear predictive coding (LPC) coefficients, line spectral pair (LSP) coefficients, and the like. The subword model may also include subword tying information that indicates two or more subword units that can be merged into a single subword unit (e.g., one of the merged subword units if the subwords are identified to be similar). When the subword model is adjusted by the pre-adaptation unit 814, the storage unit 840 may store the adjusted subword model in addition to the subword model.

The storage unit 840 may also store one or more keyword models for detecting predetermined keywords and one or more keyword models for detecting user-defined keywords. The keyword models for detecting predetermined keywords may be pre-stored in the storage unit 840 or downloaded from an external server or device (not shown) via the communication unit 832. In one embodiment, the keyword model may include a sequence of subwords including a plurality of portions (i.e., a plurality of subwords or subword units), which can be determined from one or more sample sounds indicative of a user-defined keyword by the user-defined keyword model generation unit 816. The keyword model may also include model parameters associated with each of a plurality of subwords in the sequence of subwords, and a threshold score for detecting a keyword.

In another embodiment, the keyword model may include a subword network. The subword network may include a plurality of nodes and a plurality of lines that can connect at least two nodes of the plurality of nodes. The keyword model may also include at least one graphical model such as a Gaussian mixture model (GMM), a hidden Markov model (HMM), a semi-Markov model (SMM), and the like, which corresponds to a node of the subword network. The graphical model may include a number of states and parameters such as a transition probability, a state output probability, etc.

The storage unit 840 may also store a detection history database including sample sounds and detection labels for the sample sounds. For example, a detection label for a sample sound may indicate whether the sample sound has been correctly detected as a keyword speech or a non-keyword speech. In a similar manner, a detection label for a sample sound may indicate whether the sample sound has been incorrectly detected as a keyword speech or a non-keyword speech. Detection labels may be provided by a user, via the I/O unit 830, or determined during a keyword detection process. The detection history database may be used in a discriminative training on the keyword model for a user-defined keyword. The storage unit 840 may also store one or more phonetically-balanced sentences (e.g., Harvard sentences) and their corresponding sequences or networks of subwords.

The subword recognition unit 812 in the processor 810 may be configured to perform subword recognition of one or more sample sounds using at least one subword model stored in the storage unit 840. In one embodiment, the subword recognition unit 812 may receive an input sound stream including one or more sample sounds from the sound sensor 800 and extract each of the sample sounds from the input sound stream using any suitable endpoint detection algorithms. Alternatively, at least one mixed sound stream may be received from the mixed sound generation unit 828 to extract each of the sample sounds, which may include one or more types of noise, from the at least one mixed sound stream using any suitable endpoint detection algorithms. In another embodiment, the subword recognition unit 812 may receive one or more sample sounds from the sound sensor 800, which may extract the sample sounds from an input sound stream. Alternatively, one or more mixed sample sounds may be received from the mixed sound generation unit 828.

For the sample sounds or mixed sample sounds that are received or extracted, the subword recognition unit 812 may perform subword recognition on each of the sample sounds or mixed sample sounds. In one embodiment, the subword recognition unit 812 may perform monophone recognition on each of the sample sounds or mixed sample sounds to generate a sequence of subwords for each of the sample sounds or mixed sample sounds. For example, the subword recognition unit 812 may generate five sequences of subwords from five sample sounds, respectively, as shown in Table 1.

TABLE 1

| SEQUENCE NO. | SEQUENCE OF SUBWORDS |
| --- | --- |
| SEQUENCE 1 | sil a g i l m jv g c ju s i n sil |
| SEQUENCE 2 | sil c ju n ju n o g c wi sil |
| SEQUENCE 3 | a g i n z u oi g sil |
| SEQUENCE 4 | sil a n ju r o c ss i ng |
| SEQUENCE 5 | g a i g ee wv d c wi |

In Table 1, a space between two subwords in each sequence may distinguish the two subwords. In the illustrated sequences of subwords, a subword unit "sil" may indicate silence, a silent sound, or an absence of sound. The generated sequences may be provided to at least one of the pre-adaptation unit 814 and the user-defined keyword model generation unit 816.

In some embodiments, the subword recognition unit 812 may use pronunciation information associated with text for a user-defined keyword in performing the subword recognition. For example, when text for the user-defined keyword is received from the I/O unit 830, the subword recognition unit 812 may retrieve pronunciation information associated with the user-defined keyword from the pronunciation dictionary database stored in the storage unit 840. Alternatively, the subword recognition unit 812 may communicate with an external server or device (not shown) that stores pronunciation data or information of dictionary words to retrieve the pronunciation information associated with the user-defined keyword. Each sequence of subwords for the user-defined keyword may then be determined for each of the sample sounds or mixed sample sounds using pronunciation information associated with the text for the user-defined keyword.

The pre-adaptation unit 814 may be configured to adjust at least one subword model stored in the storage unit 840 based on at least one sample sound indicative of a predetermined sentence. The predetermined sentence may be at least one of phonetically-balanced sentences (e.g., Harvard sentences) that may use specific phonemes at a same or similar frequency as the phonemes may appear in a language. For pre-adaptation of the subword model, the sound sensor 800 may receive an input sound stream including at least one sample sound indicative of the predetermined sentence. For example, a user may be prompted to read the predetermined sentence that may be displayed on the display screen 110. When the user reads the predetermined sentence, the pre-adaptation unit 814 may receive an input sound stream including the predetermined sentence read by the user and extract acoustic features from the input sound stream. From the extracted acoustic features, the pre-adaptation unit 814 may adjust the subword model from the storage unit 840 and store the adjusted subword model in the storage unit 840. In one embodiment, the pre-adaptation unit 814 may adjust model parameters of the subword model based on the extracted acoustic features and a sequence of subwords for the predetermined sentence stored in the storage unit 840.

In some embodiments, when a keyword model for a user-defined keyword has been generated without pre-adaptation of a subword model used in generating the user-defined keyword, the pre-adaptation unit 814 may generate a new keyword model for the user-defined keyword based on the adjusted subword model. For example, the pre-adaptation unit 814 may transmit a signal to the subword recognition unit 812 to retrieve one or more sample sounds indicative of the user-defined keyword from the storage unit 840 and perform subword recognition on the sample sounds using the adjusted subword model. Once the subword recognition unit 812 generates sequences of subwords for the sample sounds, the pre-adaptation unit 814 may transmit a signal instructing the user-defined keyword model generation unit 816 to receive the generated sequences of subwords from the subword recognition unit 812 and generate the new keyword model for the user-defined keyword using the adjusted subword model.

The user-defined keyword model generation unit 816 may be configured to generate a keyword model for a user-defined keyword based on the generated sequences of subwords from the subword recognition unit 812. The user-defined keyword model generation unit 816 may receive the sequences of subwords from the subword recognition unit 812 and determine a sequence of subwords from the received sequences. In one embodiment, a length for each of the sequences may be determined and one of the sequences having a longest length may be selected as the sequence of subwords. The length of each sequence of subwords may be the number of subwords in each sequence. For example, SEQUENCE 1 in Table 1 having a longest length among the five sequences may be selected as the sequence of subwords.

Additionally or alternatively, the user-defined keyword model generation unit 816 may combine a plurality of portions (e.g., a plurality of subwords) from at least two of the sequences of subwords to generate the sequence of subwords. For example, given two sequences of subwords, one or more identical subwords and associated positions in the sequences may be identified. Additionally, one or more subwords in one sequence that is not in the other sequence as well as positions of such subwords in the sequences may be identified. In this case, the identical subwords may be sequenced according to the associated positions and the one or more subwords that are in one sequence but not the other sequence may be inserted into the sequence based on the associated positions. In this manner, the user-defined keyword model generation unit 816 may determine a sequence of subwords by combining the identified subwords from the two sequences according to the associated positions in the sequences. It should be appreciated that the user-defined keyword model generation unit 816 may also generate a sequence of subwords from any suitable number of sequences of subwords.

In some embodiments, once the sequence of subwords has been determined, the user-defined keyword model generation unit 816 may modify the sequence of subwords by adding a subword for silence to a beginning or an end of the sequence of subwords. For example, when a subword for silence does not exist at the beginning of the sequence of subwords, a subword for silence may be added to the beginning of the sequence of subwords. Similarly, when a subword for silence does not exist at the end of the sequence of subwords, a subword for silence may be added to the end of the sequence of subwords.

Based on the sequence of subwords and at least one subword model from the storage unit 840, the user-defined keyword model generation unit 816 may generate a keyword model for a user-defined keyword associated with one or more sample sounds. In this process, the user-defined keyword model generation unit 816 may retrieve model parameters associated with each of the subwords in the sequence of subwords from the subword model. The sequence of subwords and the retrieved model parameters associated with each of the subwords in the determined sequence of subwords may then be designated and output as the keyword model for a user-defined keyword. In one embodiment, the user-defined keyword model generation unit 816 may adjust at least one subword model from the storage unit 840 based on the sequence of subwords and/or one or more sample sounds indicative of the user-defined keyword, and store the adjusted subword model in the storage unit 840.

The user-defined keyword model generation unit 816 may generate a keyword model for a user-defined keyword by generating a subword network based on a plurality of sequences of subwords received from the subword recognition unit 812. In one embodiment, the user-defined keyword model generation unit 816 may generate the subword network by combining the sequences of subwords into a single network including a plurality of nodes and a plurality of lines that may connect at least two nodes of the plurality of nodes under a graphical model such as a hidden Markov model (HMM), a semi-Markov model (SMM), or a combination thereof. The user-defined keyword model generation unit 816 may also prune (e.g., reduce) the subword network by merging two or more similar nodes into a single node (e.g., one of the similar nodes) based on any suitable graph merging algorithms. The plurality of nodes in the subword network and at least one graphical model that corresponds to the node in the subword network such as a Gaussian mixture model (GMM), a hidden Markov model (HMM), a neural network, and the like may then be designated and output as the keyword model for a user-defined keyword.

In some embodiments, the I/O unit 830 may receive text designating the user-defined keyword for use in generating a keyword model from a user. The text for the user-defined keyword may then be provided to the user-defined keyword model generation unit 816. Upon receiving the text designating the user-defined keyword, the user-defined keyword model generation unit 816 may convert the text for the user-defined keyword into a sequence of subwords indicative of the user-defined keyword. In one embodiment, a sequence of subwords for the user-defined keyword may be determined based on pronunciation information associated with the text for the user-defined keyword by accessing the pronunciation dictionary database stored in the storage unit 840. Alternatively, the user-defined keyword model generation unit 816 may communicate with an external server or device (not shown) that stores pronunciation data or information of dictionary words to receive the pronunciation information associated with the text for the user-defined keyword. When the text for the user-defined keyword does not match any dictionary words in the pronunciation dictionary database, the user-defined keyword model generation unit 816 may generate a sequence of subwords by determining pronunciations for the text based on any suitable linguistic and/or pronunciation rules and determining the sequence of subwords based on the pronunciations.

To enhance accuracy in detecting a user-defined keyword, the user-defined keyword model generation unit 816 may determine a threshold score indicative of a confidence level in detecting the user-defined keyword. Initially, the user-defined keyword model generation unit 816 may calculate a matching score for each of one or more sample sounds indicative of the user-defined keyword that are received from a user based on the keyword model associated with the user-defined keyword. Based on the calculated matching score for each sample sound, a threshold score for detecting the user-defined keyword may be determined. For example, matching scores for the five sequences in Table 1 may be determined as 9.5, 9.0, 8.3, 6.5, and 6, respectively. In this case, the threshold score may be determined to be a score less than the five matching scores (e.g., 5.0) and used for detecting the user-defined keyword in an input sound stream.

In an additional embodiment, the mixed sound generation unit 828 may generate one or more mixed sample sounds by adding at least one type of noise to the sample sounds that are received from a user and indicative of a user-defined keyword. The user-defined keyword model generation unit 816 may receive the mixed sample sounds and calculate a matching score for each of the mixed sample sounds. A threshold score for detecting the user-defined keyword may then be determined based on the calculated matching score for each of the sample sounds and the mixed sample sounds. In this case, the threshold score may be determined to be a score less than all matching scores for the sample sounds and the mixed sample sounds.

The user-defined keyword model generation unit 816 may adjust a threshold score for a user-defined keyword. For adjusting the threshold score, the sound sensor 800 may receive an input sound stream indicative of the user-defined keyword as a test input sound. Upon receiving the test input sound, the user-defined keyword model generation unit 816 may sequentially extract a plurality of sound features from the test input sound and calculate a matching score between the extracted sound features and the sequence or network of subwords in the keyword model for the user-defined keyword. Based on the calculated matching score, the threshold score for detecting the user-defined keyword may be adjusted. For example, when the calculated matching score is 4.5, the user-defined keyword model generation unit 816 may adjust the threshold score from 5.0 to a score less than 4.5 (e.g., 4).

In one embodiment, the user-defined keyword model generation unit 816 may transmit a signal instructing the subword recognition unit 812 to perform subword recognition on the test input sound indicative of the user-defined keyword. In response, the subword recognition unit 812 may generate a sequence of subwords based on the test input sound. The user-defined keyword model generation unit 816 may then receive the generated sequence of subwords from the subword recognition unit 812 and update the keyword model for the user-defined keyword based on the generated sequence of subwords.

Once a keyword model for detecting a user-defined keyword has been generated, the user-defined keyword model generation unit 816 may perform a discriminative training on the keyword model to enhance accuracy in detecting the user-defined keyword. In this process, the user-defined keyword model generation unit 816 may access a detection history database from the storage unit 840 and identify one or more sample sounds that are associated with a predetermined keyword and incorrectly detected as including the user-defined keyword based on detection labels of the sample sounds. Additionally, one or more sample sounds that are associated with the user-defined keyword but are not detected correctly as including the user-defined keyword may be identified based on detection labels of the sample sounds. The user-defined keyword model generation unit 816 may then configure the keyword model such that the sample sounds associated with the pre-determined keyword that have been incorrectly detected are not detected as including the user-defined keyword, and the sample sounds associated with the user-defined keyword that have been not detected correctly are detected as including the user-defined keyword.

The speech detector 822 may be configured to determine whether an input sound stream received by the sound sensor 800 includes sound of interest (e.g., speech). In one embodiment, the sound sensor 800 may receive an input sound stream indicative of a user-defined keyword or a predetermined keyword periodically according to a duty cycle. For example, the sound sensor 800 may operate on a 10% duty cycle such that the sound sensor 800 receives the input sound stream 10% of the time (e.g., 20 ms in a 200 ms period). In this case, the sound sensor 800 may analyze signal characteristics of the received portion of the input sound stream and determine whether the received portion of the input sound stream exceeds a threshold sound intensity. When the received portion of the input sound stream is determined to be sound exceeding the threshold sound intensity, the sound sensor 800 may activate the speech detector 822 and provide the received portion to the speech detector 822. Alternatively, without determining whether the received portion exceeds a threshold sound intensity, the sound sensor 800 may receive a portion of the input sound stream periodically and activate the speech detector 822 to provide the received portion to the speech detector 822.

The speech detector 822, when activated, may receive the portion of the input sound stream from the sound sensor 800. In one embodiment, the speech detector 822 may extract one or more sound features from the received portion and determine whether the extracted sound features indicate sound of interest such as speech by using any suitable sound classification method such as a Gaussian mixture model (GMM) based classifier, a neural network, a HMM, a graphical model, and a Support Vector Machine (SVM) technique. If the received portion is determined to be sound of interest, the speech detector 822 may activate the voice activation unit 824 and the received portion and the remaining portion of the input sound stream may be provided to the voice activation unit 824. In some other embodiments, the speech detector 822 may be omitted in the processor. In this case, when the received portion exceeds the threshold sound intensity, the sound sensor 800 may activate the voice activation unit 824 and provide the received portion and the remaining portion of the input sound stream directly to the voice activation unit 824.

The voice activation unit 824, when activated, may be configured to receive the input sound stream and detect at least one user-defined keyword or at least one predetermined keyword based on keyword models for at least one user-defined keyword and at least one predetermined keyword. For example, the voice activation unit 824 may sequentially extract a plurality of sound features from the input sound stream and determine a matching score for at least one keyword (including at least one user-defined keyword and at least one predetermined keyword) based on the keyword models. If a matching score for at least one keyword exceeds a threshold score associated with the at least one keyword, the voice activation unit 824 may detect the input sound stream as including at least one keyword. According to one embodiment, the voice activation unit 824 may store the input sound stream and the detection label for the input sound stream in a detection history database of the storage unit 840. For example, when the matching score exceeds a high confidence threshold that may be set to a value higher than a threshold score, the detection label indicating that the sample sound has been correctly detected as a keyword speech may be generated and stored with the input sound stream in the storage unit 840. In a similar manner, when the matching score is below a low confidence threshold that may be set a value lower than a threshold score, the detection label indicating that the sample sound has been correctly detected as a non-keyword speech may be generated and stored with the input sound stream in the storage unit 840. Additionally, the detection label for the input sound stream may be provided by a user, via the I/O unit 830.

Upon detecting the keyword, the voice activation unit 824 may perform a function associated with the keyword or activate an application associated with the keyword. Additionally or alternatively, the voice activation unit 824 may generate and transmit an activation signal to turn on the voice assistant unit 826, which may be associated with the detected keyword. The voice assistant unit 826 may be activated in response to the activation signal from the voice activation unit 824. Once activated, the voice assistant unit 826 may perform a voice assistant function by outputting a message such as "MAY I HELP YOU?" on the display screen 110 and/or through a speaker of the I/O unit 830. In response, a user may speak voice commands to activate various associated functions of the electronic device 100. For example, when a voice command for Internet search is received, the voice assistant unit 826 may recognize the voice command as a search command and perform a web search via the communication unit 832.

Figure 9:
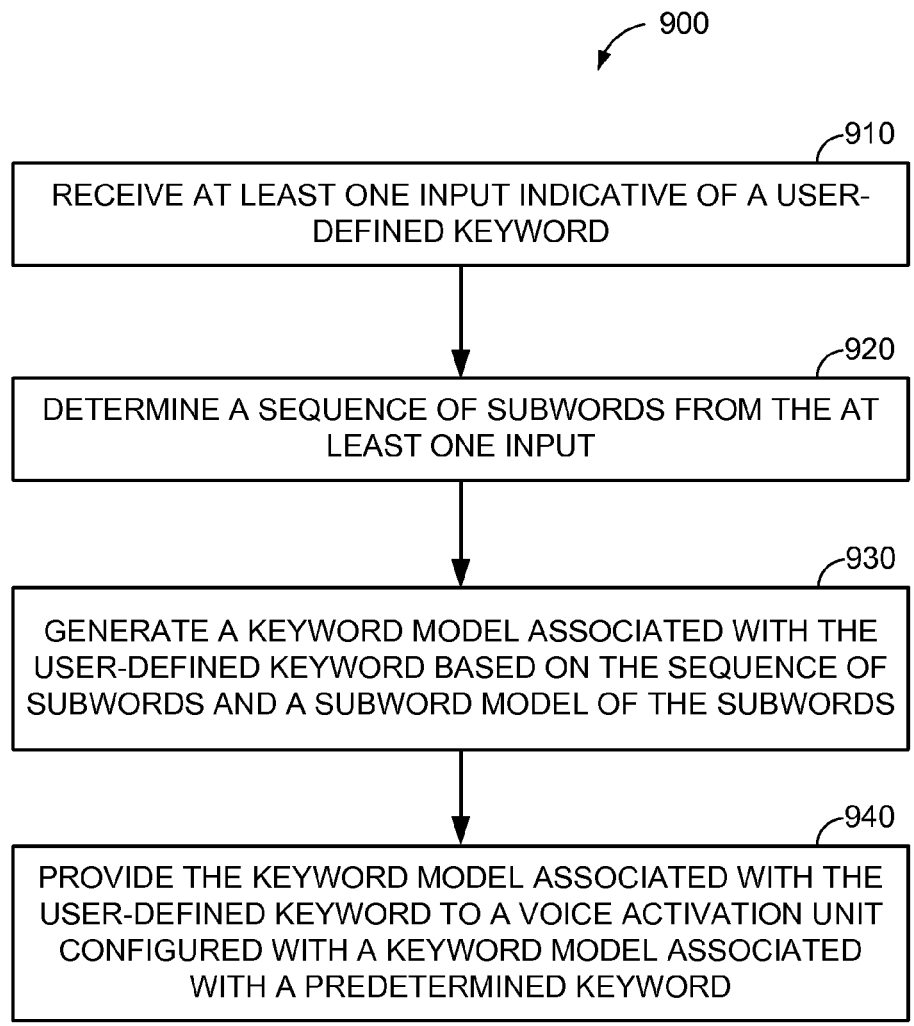
FIG. 9 is a flow chart of an exemplary method, performed in an electronic device, for generating a keyword model of a user-defined keyword from at least one input indicative of the user-defined keyword, according to one embodiment of the present disclosure.

FIG. 9 is a flow chart of a method 900, performed in the electronic device 100, for generating a keyword model of a user-defined keyword from at least one input indicative of the user-defined keyword, according to one embodiment of the present disclosure. Initially, the electronic device 100 may receive at least one input indicative of the user-defined keyword, at 910. The at least one input may include at least one of text for the user-defined keyword and at least one sample sound indicative of the user-defined keyword. From the at least one input, the electronic device 100 may determine a sequence of subwords, at 920. Based on the sequence of subwords and a subword model of the subwords, the electronic device 100 may generate the keyword model associated with the user-defined keyword, at 930. The electronic device 100 may provide the keyword model associated with the user-defined keyword to a voice activation unit configured with a keyword model associated with a predetermined keyword, at 940.

Figure 10:
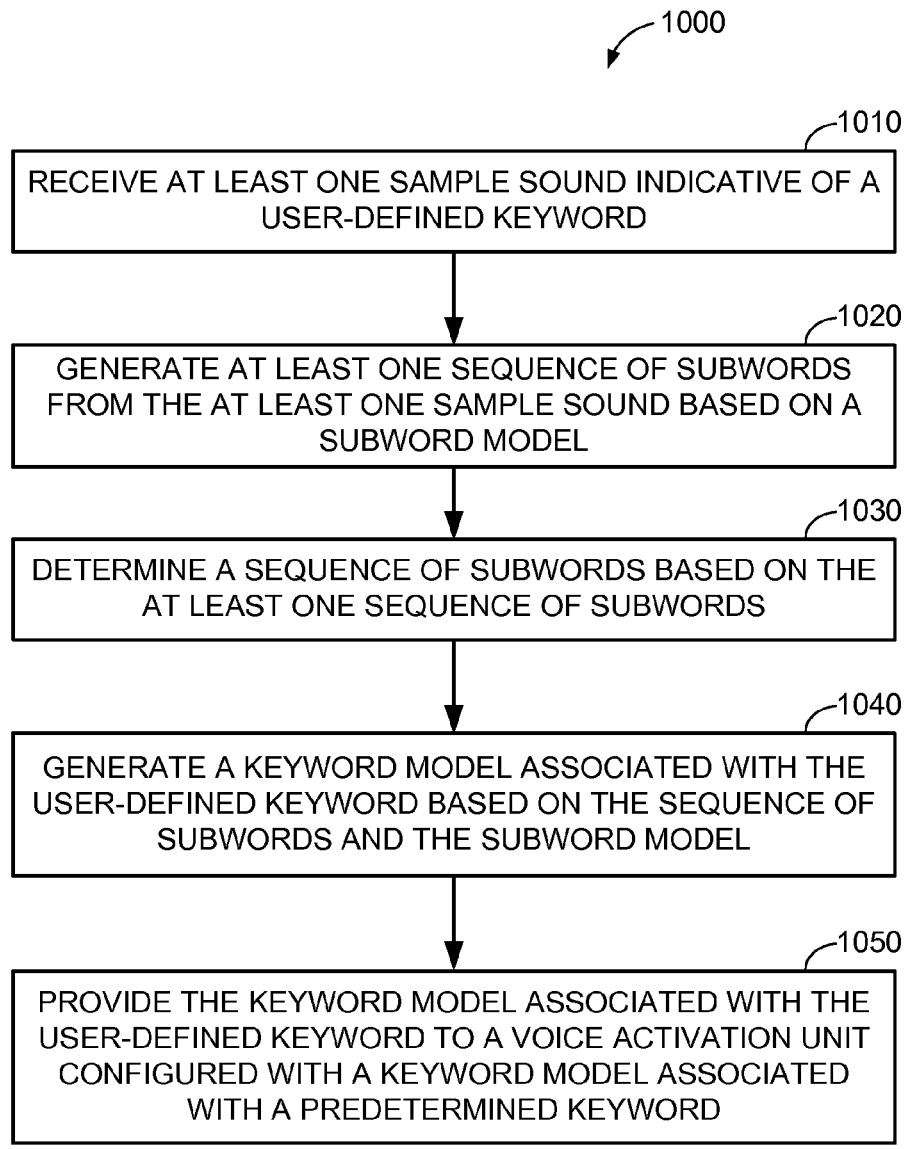
FIG. 10 is a flow chart of an exemplary method, performed in an electronic device, for generating a keyword model of a user-defined keyword from at least one sample sound indicative of the user-defined keyword, according to one embodiment of the present disclosure.

FIG. 10 is a flow chart of a method 1000, performed in the electronic device 100, for generating a keyword model of a user-defined keyword from at least one sample sound indicative of the user-defined keyword, according to one embodiment of the present disclosure. Initially, the electronic device 100 may receive at least one sample sound indicative of the user-defined keyword, at 1010. From the at least one sample sound, the electronic device 100 may generate at least one sequence of subwords based on a subword model, at 1020. Based on the at least one sequence of subwords, the electronic device 100 may determine a sequence of subwords, at 1030. Based on the sequence of subwords and the subword model, the electronic device 100 may generate the keyword model associated with the user-defined keyword, at 1040. The electronic device 100 may provide the keyword model associated with the user-defined keyword to a voice activation unit configured with a trained keyword model for a predetermined keyword, at 1050.

Figure 11:
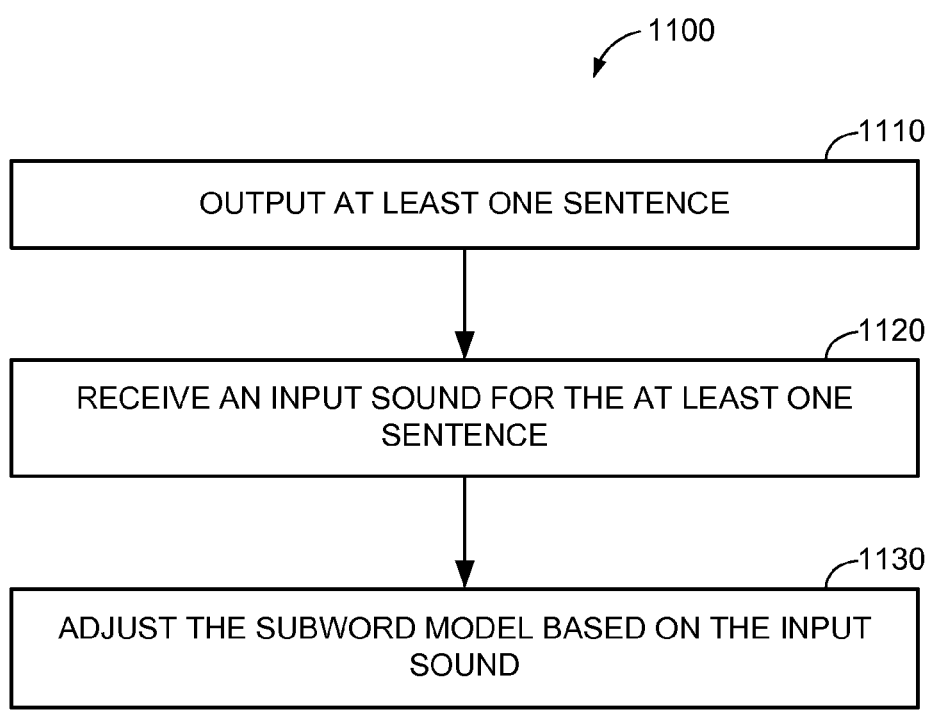
FIG. 11 is a flow chart of an exemplary method, performed in an electronic device, for adjusting a subword model that is used in generating a keyword model for detecting a user-defined keyword, according to one embodiment of the present disclosure.

FIG. 11 is a flow chart of a method 1100, performed in the electronic device 100, for adjusting a subword model that is used in generating a keyword model for detecting a user-defined keyword, according to one embodiment of the present disclosure. The electronic device 100 may output at least one sentence on the display screen 110 of the electronic device 100, at 1110. The at least one sentence may be at least one of phonetically-balanced sentences (e.g., Harvard sentences) that may use specific phonemes at a same or similar frequency as they appear in a language. The electronic device 100 may receive an input sound for the at least one sentence, at 1120. Based on the input sound, the electronic device 100 may adjust the subword model, at 1130.

Figure 12:
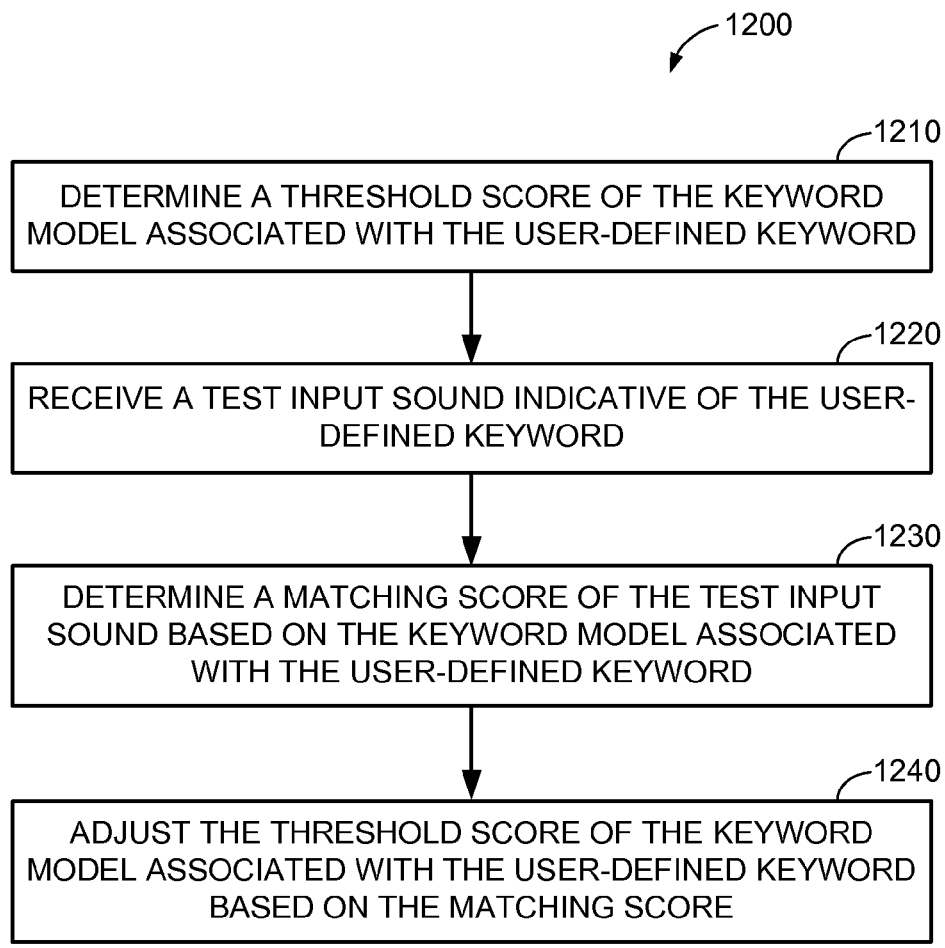
FIG. 12 is a flow chart of an exemplary method, performed in an electronic device, for adjusting a threshold score for detecting a user-defined keyword based on an input sound, according to one embodiment of the present disclosure.

FIG. 12 is a flow chart of a method 1200, performed in the electronic device 100, for adjusting a threshold score for detecting a user-defined keyword based on an input sound, according to one embodiment of the present disclosure. The electronic device 100 may determine a threshold score of the keyword model associated with the user-defined keyword, at 1210. The electronic device 100 may receive a test input sound indicative of the user-defined keyword, at 1220. The electronic device 100 may determine a matching score of the test input sound based on the keyword model associated with the user-defined keyword, at 1230. Based on the matching score, the electronic device 100 may adjust the threshold score of the keyword model associated with the user-defined keyword, at 1240.

Figure 13:
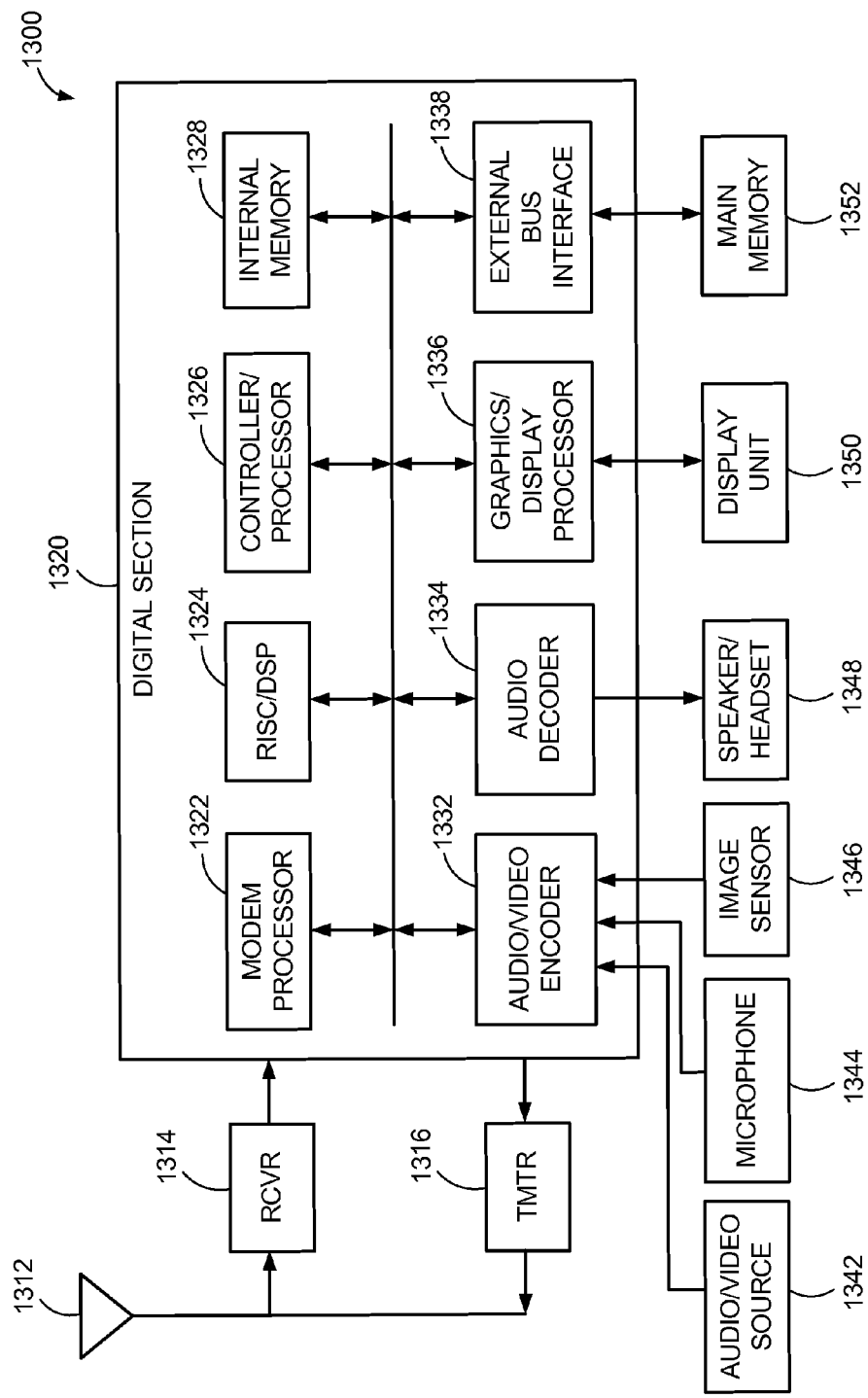
FIG. 13 is a block diagram of an exemplary electronic device in which the methods and apparatus for generating a keyword model for use in detecting a user-defined keyword may be implemented, according to some embodiments of the present disclosure.

FIG. 13 is a block diagram of an exemplary electronic device 1300 in which the methods and apparatus for generating a keyword model for use in detecting a user-defined keyword may be implemented according to some embodiments of the present disclosure. The configuration of the electronic device 1300 may be implemented in the electronic devices according to the above embodiments described with reference to FIGS. 1 to 12. The electronic device 1300 may be a cellular phone, a smartphone, a tablet computer, a laptop computer, a terminal, a handset, a personal digital assistant (PDA), a wireless modem, a cordless phone, etc. The wireless communication system may be a Code Division Multiple Access (CDMA) system, a Broadcast System for Mobile Communications (GSM) system, Wideband CDMA (WCDMA) system, Long Tern Evolution (LTE) system, LTE Advanced system, etc. Further, the electronic device 1300 may communicate directly with another mobile device, e.g., using Wi-Fi Direct or Bluetooth.

The electronic device 1300 is capable of providing bidirectional communication via a receive path and a transmit path. On the receive path, signals transmitted by base stations are received by an antenna 1312 and are provided to a receiver (RCVR) 1314. The receiver 1314 conditions and digitizes the received signal and provides samples such as the conditioned and digitized digital signal to a digital section for further processing. On the transmit path, a transmitter (TMTR) 1316 receives data to be transmitted from a digital section 1320, processes and conditions the data, and generates a modulated signal, which is transmitted via the antenna 1312 to the base stations. The receiver 1314 and the transmitter 1316 may be part of a transceiver that may support CDMA, GSM, LTE, LTE Advanced, etc.

The digital section 1320 includes various processing, interface, and memory units such as, for example, a modem processor 1322, a reduced instruction set computer/digital signal processor (RISC/DSP) 1324, a controller/processor 1326, an internal memory 1328, a generalized audio/video encoder 1332, a generalized audio decoder 1334, a graphics/display processor 1336, and an external bus interface (EBI) 1338. The modem processor 1322 may perform processing for data transmission and reception, e.g., encoding, modulation, demodulation, and decoding. The RISC/DSP 1324 may perform general and specialized processing for the electronic device 1300. The controller/processor 1326 may perform the operation of various processing and interface units within the digital section 1320. The internal memory 1328 may store data and/or instructions for various units within the digital section 1320.

The generalized audio/video encoder 1332 may perform encoding for input signals from an audio/video source 1342, a microphone 1344, an image sensor 1346, etc. The generalized audio decoder 1334 may perform decoding for coded audio data and may provide output signals to a speaker/headset 1348. The graphics/display processor 1036 may perform processing for graphics, videos, images, and texts, which may be presented to a display unit 1350. The EBI 1338 may facilitate transfer of data between the digital section 1320 and a main memory 1352.

The digital section 1320 may be implemented with one or more processors, DSPs, microprocessors, RISCs, etc. The digital section 1320 may also be fabricated on one or more application specific integrated circuits (ASICs) and/or some other type of integrated circuits (ICs).

In general, any device described herein may represent various types of devices, such as a wireless phone, a cellular phone, a laptop computer, a wireless multimedia device, a wireless communication personal computer (PC) card, a PDA, an external or internal modem, a device that communicates through a wireless channel, etc. A device may have various names, such as access terminal (AT), access unit, subscriber unit, mobile station, mobile device, mobile unit, mobile phone, mobile, remote station, remote terminal, remote unit, user device, user equipment, handheld device, etc. Any device described herein may have a memory for storing instructions and data, as well as hardware, software, firmware, or combinations thereof.

The techniques described herein may be implemented by various means. For example, these techniques may be implemented in hardware, firmware, software, or a combination thereof. Those of ordinary skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, the various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

For a hardware implementation, the processing units used to perform the techniques may be implemented within one or more ASICs, DSPs, digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

Thus, the various illustrative logical blocks, modules, and circuits described in connection with the disclosure herein are implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternate, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in software, the functions may be stored on or transmitted over as one or more instructions or code on a computer-readable medium. Computer-readable media include both computer storage media and communication media including any medium that facilitates the transfer of a computer program from one place to another. A storage media may be any available media that can be accessed by a computer. By way of example, and not limited thereto, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Further, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc, where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein are applied to other variations without departing from the spirit or scope of the disclosure. Thus, the disclosure is not intended to be limited to the examples described herein but is to be accorded the widest scope consistent with the principles and novel features disclosed herein.

Although exemplary implementations are referred to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices may include PCs, network servers, and handheld devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method, performed in an electronic device, for generating a keyword model associated with a user-defined keyword, the method comprising:
    receiving a speech input from a user, at a sensor of the electronic device, in response to a prompt;
    extracting a speech segment from the speech input;
    determining a sequence of subwords representative of the speech segment of the speech input;
    obtaining at least one subword model based on the sequence of subwords, wherein the at least one subword model includes a plurality of subword units and model parameters associated with each of the plurality of subword units;
    generating the keyword model associated with the user-defined keyword by:
        modifying the plurality of subword units of the at least one subword model based on the sequence of subwords representative of the speech segment of the speech input; and
        adjusting the model parameters of the at least one subword model based on acoustic features extracted from the speech segment of the speech input; and
    providing the keyword model associated with the user-defined keyword to a voice activation unit.

2. The method of claim 1, further comprising:
    receiving an input sound; and
    detecting, based on the keyword model associated with the user-defined keyword, the user-defined keyword in the input sound.

3. The method of claim 2, further comprising performing a function associated with the user-defined keyword or a predetermined keyword.

4. The method of claim 1, wherein adjusting the model parameters based on the speech input is performed prior to generating the keyword model associated with the user-defined keyword.

5. The method of claim 1, wherein generating the keyword model associated with the user-defined keyword comprises determining a threshold score of the keyword model associated with the user-defined keyword.

6. The method of claim 5, wherein the threshold score for the keyword model associated with the user-defined keyword is adjusted by:
    receiving a test input sound indicative of the user-defined keyword;
    determining a matching score of the test input sound based on the keyword model associated with the user-defined keyword; and
    adjusting the threshold score of the keyword model associated with the user-defined keyword based on the matching score.

7. The method of claim 1, further comprising storing the keyword model associated with the user-defined keyword at a storage unit.

8. The method of claim 1, wherein the speech input includes an input sound indicative of the user-defined keyword.

9. The method of claim 8, wherein determining the sequence of subwords comprises generating the sequence of subwords from the input sound.

10. The method of claim 1, wherein the sequence of subwords includes at least one of phones, phonemes, triphones, and syllables.

11. The method of claim 1, further comprising:
generating at least one mixed sample sound by mixing the speech input with at least one type of noise.

12. The method of claim 11, wherein determining the sequence of subwords is further based on the at least one mixed sample sound.

13. The method of claim 11, wherein modifying the at least one subword model is based on the at least one mixed sample sound.

14. The method of claim 1, wherein generating the keyword model further comprises including a silence portion as a subword unit at a beginning or an end of the sequence of subwords.

15. The method of claim 3, wherein the function comprises a voice assistant application configured to output a message.

16. The method of claim 1, further comprising:
prompting the user to speak a particular sentence that is phonetically balanced;
receiving speech input indicative of the particular sentence; and
adjusting the at least one subword model based on the speech input indicative of the particular sentence.

17. The method of claim 1, wherein determining the sequence of subwords comprises deteiiiiining at least two sequences of subwords from the speech input and selecting one of the at least two sequences of subwords as the sequence of subwords.

18. An electronic device for generating a keyword model associated with a user-defined keyword, comprising:
an input unit configured to receive a speech input from a user, at a sensor of the electronic device, in response to a prompt;
a subword recognition unit configured to extract a speech segment from the speech input; and
a user-defined keyword model generation unit configured to:
determine a sequence of subwords representative of the speech segment of the speech input;
obtain at least one subword model of a plurality of subword models based on the sequence of subwords, wherein the at least one subword model includes a plurality of subword units and model parameters associated with each of the plurality of subword units;
generating the keyword model associated with the user-defined keyword by:
modify the plurality of subword units of the at least one subword model based on the sequence of subwords representative of the speech segment of the speech input; and
adjust the model parameters of the at least one subword model based on acoustic features extracted from the speech segment of the speech input; and
provide the keyword model associated with the user-defined keyword to a voice activation unit.

19. The electronic device of claim 18, wherein the input unit includes a sound sensor configured to receive at least one input indicative of the user-defined keyword.

20. The electronic device of claim 19, wherein the subword recognition unit is further configured to detect, based on the keyword model associated with the user-defined keyword, the user-defined keyword in the at least one input.

21. The electronic device of claim 18, further comprising a mixed sound generation unit configured to generate at least one mixed sample sound, the at least one mixed sound sample includes the speech input with at least one type of noise.

22. The electronic device of claim 18, wherein the voice activation unit is configured to detect the user-defined keyword in an input sound based on the keyword model associated with the user-defined keyword.

23. The electronic device of claim 18, wherein the voice activation unit is configured to perform a function associated with the user-defined keyword to activate an application associated with the user-defined keyword.

24. The electronic device of claim 18, further comprising a pre-adaptation unit configured to include a silence portion as a subword unit at a beginning or an end of the sequence of subwords.

25. The electronic device of claim 18, wherein the user-defined keyword model generation unit is configured to determine a threshold score of the keyword model associated with the user-defined keyword.

26. The electronic device of claim 25, wherein the user-defined keyword model generation unit is configured to:
determine a matching score of a test input sound indicative of the user-defined keyword based on the keyword model associated with the user-defined keyword; and
adjust the threshold score of the keyword model associated with the user-defined keyword based on the matching score.

27. A non-transitory computer-readable storage medium storing instructions for generating a keyword model associated with a user-defined keyword in an electronic device, the instructions causing a processor to perform operations of:
receiving a speech input from a user, at a sensor of the electronic device, in response to a prompt;
extracting a speech segment from the speech input;
determining a sequence of subwords representative of the speech segment of the speech input;
obtaining at least one subword model based on the sequence of subwords, wherein the at least one subword model includes a plurality of subword units and model parameters associated with each of the plurality of subword units;
generating the keyword model associated with the user-defined keyword by:
modifying the plurality of subword units of the at least one subword model based on the sequence of subwords representative of the speech segment of the speech input; and
adjusting the model parameters of the at least one subword model based on acoustic features extracted from the speech segment of the speech input; and
providing the keyword model associated with the user-defined keyword to a voice activation unit.

28. An electronic device for generating a keyword model associated with a user-defined keyword, comprising:

means for receiving a speech input from a user, at a sensor of the electronic device, in response to a prompt;

means for extracting a speech segment from the speech input;

means for determining a sequence of subwords representative of the speech segment of the speech input;

means for obtaining at least one subword model of a plurality of subword models based on the sequence of subwords, wherein the at least one subword model includes a plurality of subword units and model parameters associated with each of the plurality of subword units;

means for generating the keyword model associated with the user-defined keyword by:
- modifying the plurality of subword units of the at least one subword model based on the sequence of subwords representative of the speech segment of the speech input; and
- adjusting the model parameters of the at least one subword model based on acoustic features extracted from the speech segment of the speech input; and means for providing the keyword model associated with the user-defined keyword to a voice activation unit.

29. The electronic device of claim 28, wherein the speech input includes at least one sample sound indicative of the user-defined keyword.

30. The electronic device of claim 28, further comprising:
means for generating at least one mixed sample sound by mixing the speech input with at least one type of noise.

* * * * *